United States Patent
Bernoni

(10) Patent No.: US 6,763,865 B1
(45) Date of Patent: Jul. 20, 2004

(54) THREE PIECE WHEEL FOR MOTOR VEHICLES

(75) Inventor: Claudio Bernoni, Selvazzano Dentro (IT)

(73) Assignee: O.Z. S.p.A., Bassano Del Grappa (IT)

( * ) Notice: Subject to any disclaimer, the term of this patent is extended or adjusted under 35 U.S.C. 154(b) by 27 days.

(21) Appl. No.: 09/937,246

(22) PCT Filed: Nov. 10, 2000

(86) PCT No.: PCT/IB00/01767
§ 371 (c)(1),
(2), (4) Date: Sep. 21, 2001

(87) PCT Pub. No.: WO01/54924
PCT Pub. Date: Aug. 2, 2001

(30) Foreign Application Priority Data

Jan. 25, 2000 (IT) .................................. BO200A0025

(51) Int. Cl.[7] .............................................. B60C 11/00
(52) U.S. Cl. ..................... 152/396; 301/11.2; 301/29.2; 152/405
(58) Field of Search ................................ 301/29.2, 64.4, 301/11.2, 64.307, 11.1, 10.1, 13.1, 35.1, 35.2, 35.3, 64.301, 64.304, 64.305, 9.1; 152/396, 397, 398, 406, 405, 409, 410, 411; 29/894, 894.01, 894.32, 894.34, 894.35, 894.352

(56) References Cited

U.S. PATENT DOCUMENTS

| | | | | |
|---|---|---|---|---|
| 1,285,757 A | * | 11/1918 | McKay | ....................... 301/29.2 |
| 1,295,792 A | * | 2/1919 | Putnam | ....................... 301/29.2 |
| 1,503,057 A | * | 7/1924 | Martin | ................... 301/64.305 |
| 1,522,806 A | * | 1/1925 | Charlton | ..................... 301/29.2 |
| 1,791,596 A | * | 2/1931 | Kenslow | ..................... 301/11.1 |
| 2,363,183 A | * | 11/1944 | Hunt et al. | ............ 301/64.301 |
| 2,566,663 A | * | 9/1951 | Hollerith | ..................... 301/6.7 |
| 3,802,744 A | * | 4/1974 | Grawey et al. | ........ 301/64.305 |
| 4,466,670 A | * | 8/1984 | Kaji | ........................... 301/29.2 |
| 4,645,267 A | * | 2/1987 | Weld | ..................... 301/64.301 |
| 4,770,220 A | * | 9/1988 | Mori | ........................... 152/398 |
| 4,989,657 A | * | 2/1991 | Lipper | ........................ 152/399 |
| 5,018,566 A | * | 5/1991 | Thoni | ........................ 301/29.2 |
| 5,096,264 A | * | 3/1992 | Hayashi | ................. 301/64.202 |
| 5,435,629 A | * | 7/1995 | Suzuki | ....................... 301/29.2 |
| 5,540,108 A | * | 7/1996 | Cook et al. | ............ 73/862.041 |

FOREIGN PATENT DOCUMENTS

| | | | | |
|---|---|---|---|---|
| DE | 4033341 A1 | * | 8/1991 | ............ 301/64.301 |
| EP | 319039 A1 | * | 6/1989 | ............. B66C/9/08 |

* cited by examiner

Primary Examiner—Frantz F. Jules
(74) Attorney, Agent, or Firm—Fay, Sharpe, Fagan, Minnich & McKee, LLP

(57) ABSTRACT

A wheel (1) includes three parts: an outer rim (2), an inner rim (3), and a disc (4) joined by coach screws or stud bolts (18) directly screwed into the thickness of a wall (10) of the inner rim (3). The outer rim (2) is made from stamped light alloy plate, while the other parts are obtained by casting or other process. A portion of the outer rim (2) is compressed between the disc (4) and a portion of the inner rim (3).

6 Claims, 1 Drawing Sheet

THREE PIECE WHEEL FOR MOTOR VEHICLES

TECHNICAL FIELD

The present invention relates to a motor vehicle wheel in three parts joined by screws.

This type of wheel comprises three parts obtained separately: an inner rim, an outer rim, and a disc joined by welding or with screws.

Fastening with screws is preferable in case of maintenance on one of the rims, inner or outer, and to have greater manufacturing flexibility when defining groove width.

In other words, grooves of different widths can be produced more easily.

Generally, the disc is superposed on the outer rim for reasons of size, rigidity and aesthetics.

BACKGROUND ART

U.S. Pat. No. 4,466,670 discloses a motor vehicle wheel of the type described above. Screws with nuts are used for fastening the parts. The screws must be positioned in such a way as to be reachable from the inner and outer side of the wheel and therefore are located at a certain radial distance from the tyre insertion groove. The outer rim can present a "C" shaped protuberance towards the inner rim which is superposed thereon to favour the required seal for tubeless tyres. U.S. Pat. No. 5,435,629 describes a three piece light alloy wheel, of the "sandwich" type. In this wheel, the disc is partially inserted between the two parts of the rim so that all parts must have accurate dimensional precision. The parts of the wheel, which are obtained by casting, are connected by screws with nuts and hence the screws are located at a certain radial distance from the tyre insertion groove.

DISCLOSURE OF INVENTION

The aim of the present invention is to provide an improved three piece motor vehicle wheel which is an ideal compromise between lightness, strength and manufacturing cost and which has good aesthetics.

A further aim of the present invention is to provide a three piece motor vehicle wheel of simple and economical construction.

In accordance with an aspect of the present invention, a three piece motor vehicle wheel is presented as specified in claim 1.

The dependent claims refer to preferred and advantageous embodiments of the invention.

DESCRIPTION OF THE DRAWINGS

Embodiments of the invention are provided purely by way of non limiting example hereafter, with the aid of the accompanying drawings, in which.

DESCRIPTION OF THE ILLUSTRATIVE EMBODIMENTS

Figure 1:
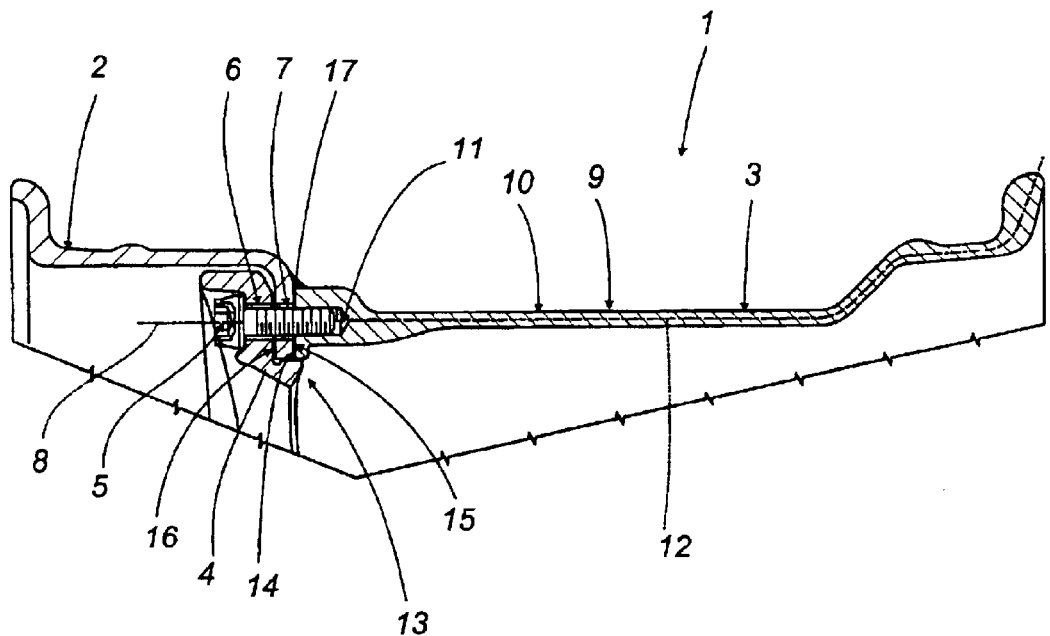
FIG. 1 shows a partial cross section of the wheel according to the present invention.

In the description that follows, the term "outer" indicates the part of the wheel that is located externally to the motor vehicle when it is mounted thereon, and similarly the term "inner" indicates the part of the wheel that is located internally to the motor vehicle.

In accordance with the figure, the wheel according to the present invention is globally indicated as 1, and comprises an outer rim 2, an inner rim 3, a disc 4, and connecting screws 5.

The disc 4 is superposed to the outer rim 2 and both present a series of through holes 6 and 7, respectively in the disc 4 and in the outer rim 2, within which pass the screws 5. The inner rim 3 presents a groove 9 with a wall 10. In the thickness of the wall 10 is found a series of threaded blind holes 11 for the passage of the screws 5. The through holes 6, the through holes 7 and the blind holes 11 are uniformly distributed along the periphery of the disc 4 and of the respective elements and are positioned in mutual correspondence, in such a way as to be traversed by the screws 5. Said screws 5 present an axis 8 which is parallel and proximate to or coinciding with the neutral axis 12 of the wall 10. In this way the screws 5 increase the overall rigidity of the wheel 1.

Since these wheels are provided for use with tubeless tyres, for air tightness the outer rim 2 has a first annular surface 14 which is in contact with a corresponding second annular surface 15 of the inner rim 3. The specific position of the screws 5 is favourable for air tightness in the area 13 where the outer rim 2 connects with the inner rim 3.

Preferably, the outer rim 2 is made of light alloy plate, for instance Anticorodal (UNI 9006/4). The inner rim 3 and the disc 4 and are obtained by casting, for instance with G—AlSi7 UNI EN 1706 or ASTM A356.0. The inner rim can also be obtained by casting with subsequent drawing, or by the "flow-forming" process, or by casting with thixotropic alloys. The disc 4 can alternatively be obtained by forging, or pressing, or also be made with composite materials such as fibre-reinforced resins.

It should therefore be noted that the first annular surface 14 of the outer rim 2 is compressed between the second surface 15 of the inner rim and a third annular surface 16 of the disc 4.

Material selection and the aforesaid form of connection favour the air tightness of the tyre (not shown herein) in the connection area 13. The outer rim 2, which is preferably made of plate, is more ductile and flexible and is compressed between the disc 4 and the inner rim 3 which are obtained by casing (or by a process which allows to obtain a greater rigidity) and hence are more rigid. The position of the screws 5 inserted in the thickness of the wall 10 of the inner circle 3 further increases the rigidity of the wheel 1. Moreover, the axis 8 of the screws 5, parallel and proximate or coinciding with the neutral axis 12 of the wall 10 increases its flexural strength, so that the wall 10 moves less as a result of stresses, and the possibility of leaks in the connection area 13 is reduced.

To enhance air tightness between the outer rim 2 and the inner rim 3, a seal 17 can be provided with silicone-based material or by welding.

The outer rim 2 made of plate presents numerous advantages: it has higher mechanical characteristics than cast rims and can better withstand impacts, which are more frequent in the outer part. The outer rim 2 can be obtained with lesser thickness than cast rims and is thus lighter, so that a better strength/resistance ratio is obtained compared to cast rims. Plate allows to obtain excellent surface finishes with no need for further treatments which are in fact necessary for cast parts, thereby diminishing the risk of wastage.

The outer rim 2 made of plate further allows to position the screws 5 on larger diameters compared to wheels with cast rims, and to have the disc 4, which allows to improve resistance against relative sliding, or in other words torsional strength, between the disc 4, the outer rim 2 and the inner rim 3.

The inner rim 3 obtained by casting has no need for particular aesthetic treatments because it is in a non visible area. The screws 5, being screwed directly into the thickness of the wall 10, require no nut for their fastening. Mounting of the pieces is facilitated and it is not necessary to provide space for the nuts on the inner side of the rim.

The construction of a wheel according to the invention is therefore more economical, overall, than prior art wheels.

Figure 2:
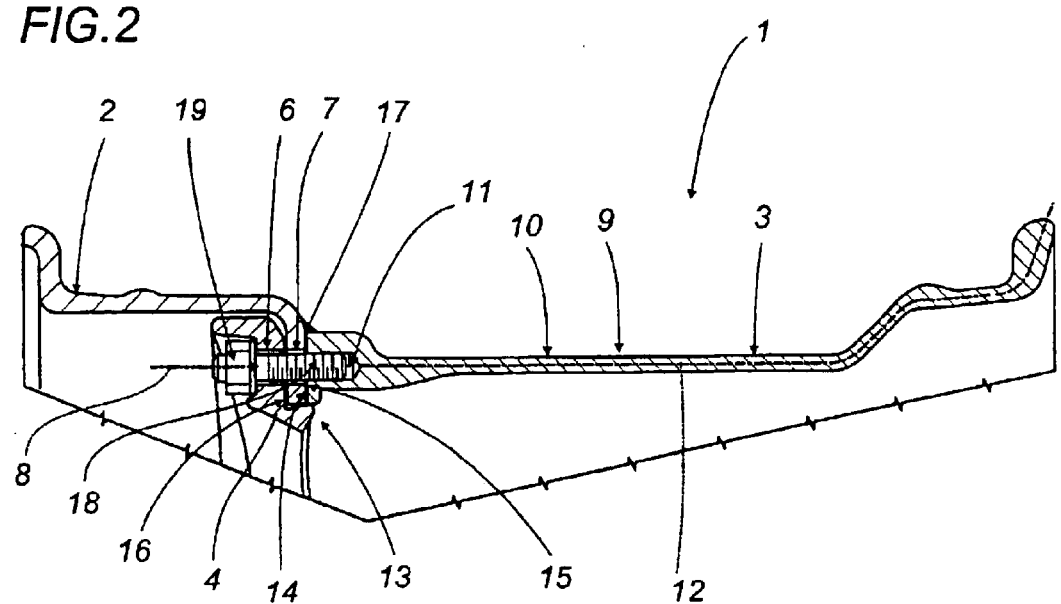
FIG. 2 shows a partial cross section of the wheel according to a variation of the present invention.

According to an alternative embodiment shown in FIG. 2 the screws 5 are replaced by stud bolts 18, already screwed in the inner rim 3, with related nuts 19 for fastening the parts. With this embodiment, the thread of the blind hole 11 is not worn out in case of frequent disassembly.

Different fastening means can also be used: instead of the screws 5 or of the stud bolts 18, for instance, one can use pins inserted by forcing.

The outer rim made of light alloy plate is particularly advantageous to obtain an aesthetically pleasing appearance. Plate allows to obtain lesser surface roughness and greater lustre directly from the production process without requiring additional machining.

The invention thus conceived can be subject to numerous modifications and variations, without thereby departing from the scope of the inventive concept. Moreover, all components can be replaced by technically equivalent elements.

Key 1 wheel
2 outer rim
3 inner rim
4 disc
5 screws
6 first holes of the disc 4
7 second holes of the outer rim 2
8 axis of screws 5 of stud bolts 18
9 groove
10 wall
11 threaded blind holes in inner rim 3
12 neutral axis of wall 10
13 connection area
14 first annular surface
15 second annular surface
16 third annular surface
17 seal or weld
18 stud bolts
19 nuts for stud bolts 18

What is claimed is:

1. A three piece wheel (1) for motor vehicles, comprising an outer rim (2) provided with a first annular surface (14) and with second holes (7) in proximity with a periphery of said outer rim, an inner rim (3) provided with a second surface (15) and with a groove (9) with a wall (10), the outer (2) and inner (3) rims forming a support for a tire; a disc (4) provided with a third annular surface (16) and with at least first holes (6) in proximity with a periphery of said disc, the disc (4) being partially superposed onto the outer rim (2); means (5; 18, 9) for connecting the disc (4), the outer rim (2) and the inner rim (3), the connecting means (5; 18, 19) being provided with an axis (8) and passing through the first (6) and the second holes (7) of the disc (4) and of the outer rim (2), the first annular surface (14) of the outer rim (2) being compressed between the second surface (15) of the inner rim (3) and the third annular surface (16) of the disc (4); wherein said connecting means (5; 18, 19) are inserted in the thickness of the wall (10) of the groove (9) of the inner rim (3) without projecting therefrom and in that the axis (8) of the connecting means (5; 18, 19) is in proximity to or coincident with a neutral axis (12) of said wall (10) of the groove (9) of the inner rim (3).

2. A wheel as claimed in claim 1, wherein the disc (4), the inner rim (3) are cast members and wherein the outer rim (2) is a stamped plate member.

3. A wheel as claimed in claim 1, wherein the connecting means are coach screws in the inner rim.

4. A wheel as claimed in claim 1, wherein the connecting means are stud bolts screwed in the inner rim and comprise fastening nuts acting on the disc.

5. A wheel as claimed in claim 2, wherein the connecting means are coach screws in the inner rim.

6. A wheel as claimed in claim 2, wherein the connecting means are stud bolts screwed in the inner rim and comprise fastening nuts acting on the disc.

* * * * *